United States Patent [19]
Caron

[11] 3,763,477
[45] Oct. 2, 1973

[54] MAGNETIC DOMAIN LOGIC CONTROL ARRANGEMENT

[75] Inventor: Lionel Caron, Holmdel, N.J.

[73] Assignee: Bell Telephone Laboratories, Incorporated, Murray Hill, Berkeley Heights, N.J.

[22] Filed: Aug. 2, 1971

[21] Appl. No.: 168,288

[52] U.S. Cl. 340/174 TF, 340/174 HA, 340/174 SR
[51] Int. Cl. ........................ G11c 19/00, G11c 11/14
[58] Field of Search ............................... 340/174 TF

[56] References Cited

UNITED STATES PATENTS

| | | | |
|---|---|---|---|
| 3,638,208 | 1/1972 | Chow | 340/174 TF |
| 3,678,287 | 7/1972 | Chow | 340/174 TF |

*Primary Examiner*—James W. Moffitt
*Attorney*—W. L. Keefauver et al.

[57] ABSTRACT

A magnetic domain logic control arrangement utilizing the timed relationship of domains along a channel is realized by a magnetically soft overlay geometry which controls the movement of single wall domains in a slice of magnetic material in response to a reorienting magnetic field. The overlay geometry defines a channel essentially doubled back upon itself to form sections. A number of interaction points are spaced along the channel in such a manner that the coincidence of domains at any interaction point is a function of the distance between those domains. Auxiliary channels are arranged such that upon domain coincidence propagation occurs along an auxiliary channel thereby controlling any one of a number of functions associated with the respective auxiliary channels.

9 Claims, 7 Drawing Figures

Patented Oct. 2, 1973 3,763,477

3 Sheets-Sheet 1

INVENTOR
L. CARON
BY
ATTORNEY

MAGNETIC DOMAIN LOGIC CONTROL ARRANGEMENT

BACKGROUND OF THE INVENTION

This invention relates to arrangements for detecting time relationships between a plurality of input signals and more particularly to such arrangements utilizing single wall magnetic domain technology.

The controlled movement of single wall magnetic domains, or bubbles, in a slice of magnetic material in response to a reorienting magnetic field is taught by A. H. Bobeck in U.S. Pat. No. 3,460,116 issued Aug. 5, 1969. Typically, the movement of the domains is controlled by the juxtaposition of a magnetically soft overlay with a surface of the material in which the domains are propagated. The overlay defines magnetic points certain areas of which become positive or negative in response to a reorienting magnetic field. The overlay elements are constructed in such a manner that different points become magnetically attractive at different magnetic field reorientations thereby defining a path or channel which is followed by a domain. One such overlay, commonly referred to as a T and Bar overlay, is detailed in the above-mentioned Bobeck patent and is arranged to control the movement of magnetic domains in response to a rotating magnetic field, illustratively having four quadrants, or reorientations, per cycle of rotation.

The usefulness of any such device depends upon the geometry of the respective elements with respect to each other. Thus the elements are advantageously arranged to take advantage of the fact that all domains in a slice of magnetic material under the influence of the same rotating field will propagate through that material in synchronous relationship with each other. Accordingly, domains which are propagated along different paths will arrive at certain points of the overlay in a predetermined coordinated relationship. This physical control of magnetic domains in spatial coordination coupled with the interaction forces between domains in close relationship with each other permits consecutive logic operations to be performed between corresponding representations of different sets of information representations solely within magnetic domain technology if the representations are organized in a form to capitalize on those properties. One such organization which supplies signals representative of a change in status of any one of a number of telephone lines is illustrated in copending application, Ser. No. 89,631 filed Nov. 16, 1970 of A. J. Perneski and R. M. Smith.

Because such devices depend upon the movement of the magnetic domains, it is thus possible to organize the apparatus to attain various logic or system functions.

It is an object of my invention to detect time relationships between input signals. More specifically it is an object of my invention to detect the occurrence of an input signal a specified number of input signals after a prior input signal.

It is another object of my invention to detect when a specified number of first events has occurred without the occurrence of a second event.

It is further a general object of my invention to provide a general arrangement of elements for the single wall magnetic domain technology to allow the attainment of time or number related logic or system functions.

SUMMARY OF THE INVENTION

In one specific embodiment of my invention, I arrange the domain control elements geometrically to define a domain propagation channel having a number of interaction points therealong. In this specific embodiment the channel is essentially looped back upon itself such that the interaction points are common to at least two different segments of the channel. A first magnetic domain propagated down the channel will thus pass through a first segment at an interaction point and then, at some subsequent time, through a second segment at that same interaction point. The time between the first and second passage of the domain at that one interaction point can be carefully determined by the length of the channel.

In accordance with an aspect of my invention, each interaction point has associated therewith an auxiliary channel along which a domain will be propagated only when there is a domain in the first channel segment at that interaction point coincident with the domain at the second channel segment at that interaction point. Each auxiliary circuit also advantageously is associated with a detector which recognizes the domain in the auxiliary channel and thus recognizes this coincidence.

Accordingly, the occurrence of an input signal, or domain, in the channel a precise time after the occurrence of a prior input signal, or domain, can be detected.

In this illustrative embodiment, T and Bar shaped overlay elements are utilized to define the domain propagation channels and interaction points so that domains are propagated along the channels under control of the geometric structure of the elements and the repulsive forces of coincident domains, all in response to a rotating in-plane field.

In accordance with another aspect of my invention, the channel through which the domains are propagated may terminate at an interaction point where they are normally blocked or trapped, thereby causing subsequent domains to be backed up in the channel or trapped one behind the other. The coincidence of domains at the first and second sections of the channel, as described above, is therefore an indication of a specified number of blocked domains or, more generally, of prior events. The first trapped or blocked domain at the interaction point may be untrapped by the occurrence of a domain in an adjacent channel, thereby diverting the trapped domain into an auxiliary channel.

Accordingly, I take advantage of the fact that magnetic domains exhibit mutually repelling forces when brought in close proximity to each other. Further I provide a geometric pattern of domain controlling elements constructed to provide outputs whenever domains along a single channel, or along a number of channels, are in a particular timed relationship with each other. Thus, in situations where the coordinated relationship between certain domains is unimportant, but where the spacing between domains is critical, outputs representative of different relative domain spacings can be derived. One example of the utilization of such an arrangement is where it is desired to determine the traffic handling capability of a telephone switchboard. In such a situation a domain may be generated every time an incoming or outgoing call is signaled to an attendant. The generated domain would then be propagated along a channel and removed from the channel only when the calling signal has been answered. The relative spacing of domains along the channel provides an indication of how many signals are arriving at any one time and also provides outputs when domains are placed in the channel faster than they are removed therefrom. These outputs may be in terms of electrical signals or may be channeled for direct control purposes.

DESCRIPTION OF THE DRAWINGS

The operation and utilization of the present invention will be more fully apparent from the following description and accompanying drawing, in which.

It will be noted that a systematic designation has been employed to illustrate the movement of domains from position to position and to facilitate a more complete understanding of the embodiment. Thus, a domain which is in a certain position at an arbitrary starting time is shown as a solid circle. As that domain moves from position to position along a defined channel in response to a continuously changing magnetic field, broken circles are used for illustration. The letter associated with the position, such as letter A in FIG. 3, serves to identify the position and to identify any domain thereat. The number associated with each such letter at a specific position represents the number of that position counting from the arbitrarily selected starting position. Thus, corresponding numbers between domains in separate channels having coordinated starting positions indicate synchronous positions between the channels. The prime sign (') is used to denote an alternate position for a domain in the associated time slot. Thus, position A3 is the position in which the domain will be three positions after a starting position A1 if no force other than the force of the reorienting magnetic field is applied thereto. This path is called the preferred path of the domain. When the domain encounters some other force, such as the repulsive force of another domain, instead of moving from position A2 to position A3 the domain moves to position A3'. The movement into the prime channel is termed the alternate path of the domain. The manner in which domains are propagated along a channel will be discussed more fully hereinafter.

DETAILED DESCRIPTION

Figure 1:
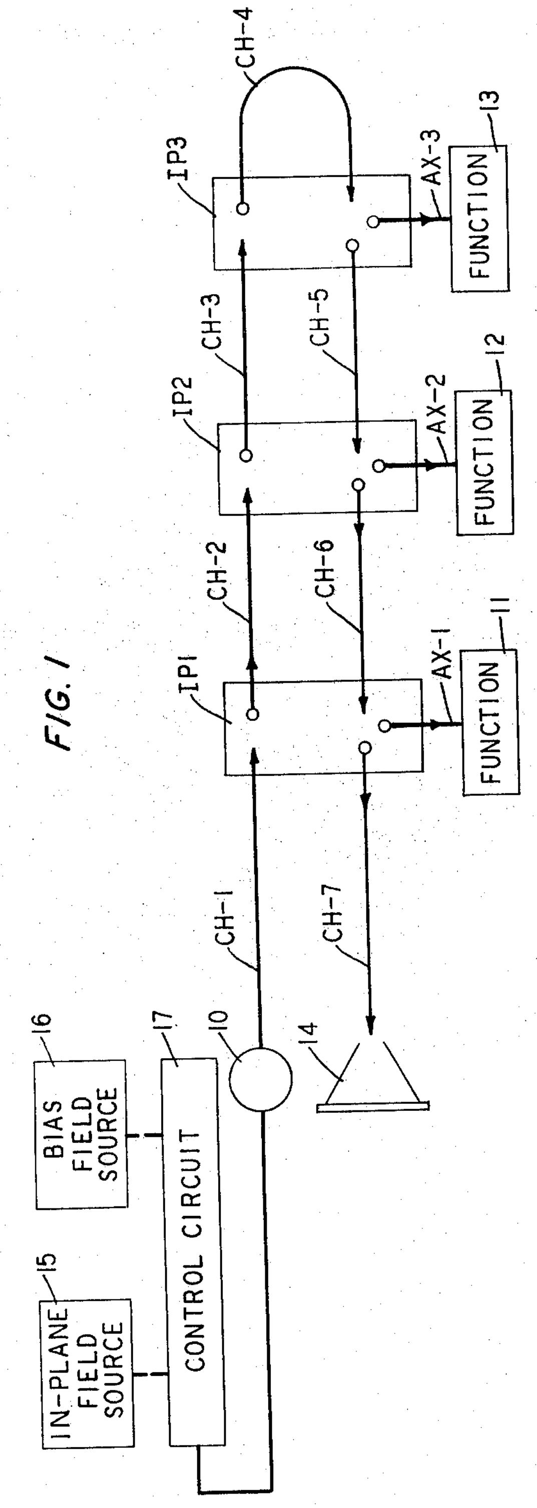
FIG. 1 is a schematic representation showing the interrelationship between the interaction points of the exemplary embodiment of the invention.

Turning now to FIG. 1, a main domain propagation channel is shown having sections CH–1 to CH–7, which sections are represented by arrows, the direction of each arrow indicating the direction of domain propagation therein. Channel section CH–1 extends from domain generator 10 to interaction point IP1. Domain generator 10 may be of the type described in U.S. Pat. No. 3,555,527 of A. J. Perneski, issued Jan. 12, 1971. Domains pass through interaction point IP1 over channel section CH–2 and through interaction point IP2 and over channel section CH–3 and through interaction point IP3. The output path from point IP3 is channel section CH–4 which channel loops back upon itself forming the completion of the respective interaction points IP3, IP2, and IP1. Thus, a domain propagated along the main channel passes through each interaction point twice.

The interaction points are each constructed with two alternate output paths. For example, interaction point IP1 has output path CH–7 and output path AX–1. Path CH–7 is the preferred path, such that domains propagated to interaction point IP1 over channel section CH–6 will continue to be propagated along channel section CH–7 to domain annihilation device 14 if, at the time when the domain passes through the interaction point, no external force other than the force of the rotating magnetic field is applied to the domain. If such an external force is applied, as would be the case if a domain simultaneously enters interaction point IP1 along channel section CH–1, the domain propagated along channel section CH–6 will be repelled to the alternate path and thus propagated along channel AX–1 to function circuit 11. Interaction points IP2 and IP3 are arranged in identical manner to interaction point IP1.

As discussed previously, domains enter channel section CH–1 from domain generator 10 under control of control circuit 17, and in-plane field source 15 and bias field source 16. Domains propagated along channel section CH–7 are annihilated by annihilation device 14. The annihilation device is arranged as detailed in U.S. Pat. No. 3,577,131, issued May 4, 1971 to R. H. Morrow and A. J. Perneski and functions to reduce any domain circulated thereto.

Figure 2:
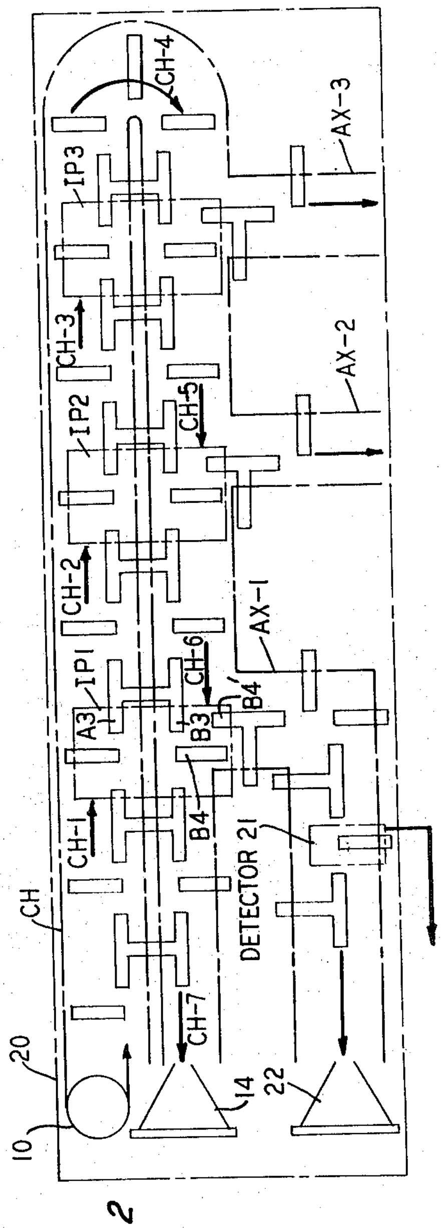
FIG. 2 is a representation of a magnetic domain overlay pattern showing the respective channels.

Continuing now in FIG. 2, an overlay pattern 20 is shown with T and Bar overlay elements superimposed upon a domain propagation substrate (not shown). Although it is contemplated that the magnetic domains will be moved along the substrate under control of the magnetically soft material patterned on the overlay it should be noted that other methods for controlling the propagation of domains may in fact be devised without departing from this invention.

In the situation where a domain has been propagated along channel segments CH–1, CH–2, CH–3, CH–4, CH–5, and CH–6 to element B3 of interaction point IP1 and a domain has been propagated along channel segment CH–1 to element A3 of interaction point IP1 concurrently therewith coincidence occurs. The domains will interact with each other and the domain at element B3, at the next reorientation of the magnetic field will move to element B4' and along the alternate path into channel AX–1 and thus pass through detector 21 before being annihilated by device 22. Detector 21 may advantageously be arranged as a Hall effect detector as disclosed in U.S. Pat. No. 3,609,720 issued Sept. 28, 1971 W. Strauss and arranged so as to provide a signal whenever a domain is detected at a certain position of the substrate. Accordingly, whenever domains are coincident at one of the interaction points a domain is moved into an auxiliary channel thereby enabling an output signal to be generated.

It is to be noted that the length of the sections CH–1 to CH–7 may be predetermined, dependent upon the number of elements involved in each section, and thus the time relationships in accordance with my invention may be preset.

NO COINCIDENCE

Figure 3:
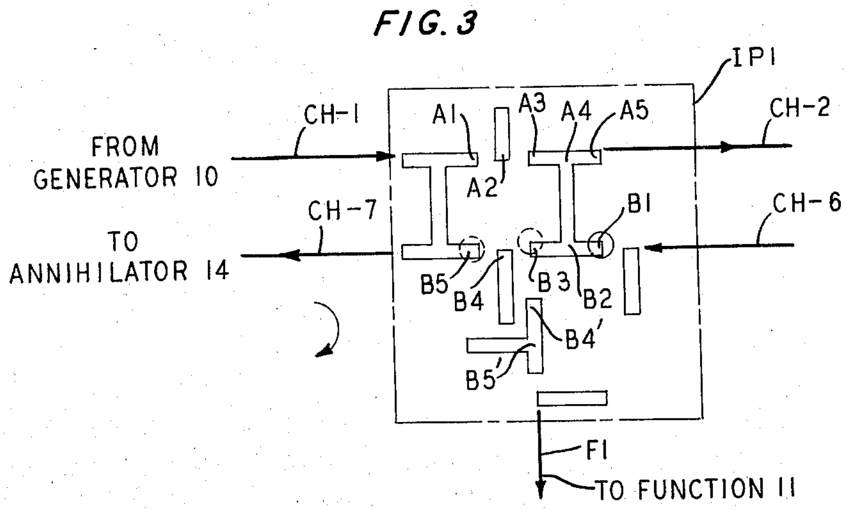
FIGS. 3 and 4 are schematic drawings showing in greater detail a typical interaction point.

Turning now to FIG. 3, assume that a domain is propagated along channel section CH–6 and no domain is propagated along channel section CH–1. Accordingly, a domain is present at position or element B1 which position has been arbitrarily selected to be a starting point for discussion purposes. Position A1, coordinated with position B1, is vacant at this point.

At the next quadrant of the rotating magnetic field the domain from position B1 moves to position B2. At each successive quadrant the domain moves along to positions B3, B4, and B5 since, as discussed above, this is the preferred path and no force has been applied to the domain other than the reorienting magnetic field. Thus, the domain entering interaction point IP1 along main channel section CH–6 passes through that point and continues along main channel section CH–7 to annihilator 14.

It should be noted at this point that a domain propagated along channel section CH–1 passes through interaction point IP1 from position A1 through the intermediary positions to position A5 and continues along channel section CH–2 whether or not a domain is concurrently in channel section CH–6; since, with respect to position A3 of channel section CH–1, there is no alternate position for the domain.

COINCIDENCE

Figure 4:
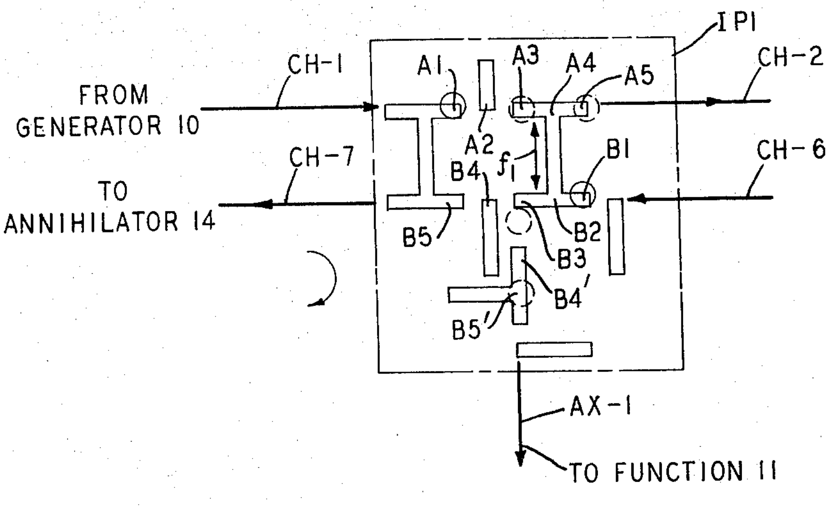

Assuming now that domains are propagated concurrently along channel sections CH–1 and CH–6 in coordinated relationship, we see from FIG. 4 that a domain is present in position B1 concurrently with the presence of a domain in position A1. Two rotational magnetic field quadrants later the domains are in respective positions B3 and A3 where they exert force, such as force $f1$, on each other. This force tends to move both domains repulsively away from each other such that domain B3 moves closer to position B4′ than to position B4. Thus, at the next quadrant of the rotating magnetic field domain B3 moves along the alternate path to position B4′ while domain A3 moves along its only path to position A4. Accordingly, the domain from channel section CH–1 passes through interaction point IP1 and along channel section CH–2 whether or not a domain is present in channel CH–6. However, as shown, the domain in channel section CH–6 is moved from the preferred path CH–7 to the alternate path AX–1 and propagates along the positions B4′, B5′ to function 11 for control purposes.

SCANNER CONTROL

Figures 5, 6, 7:
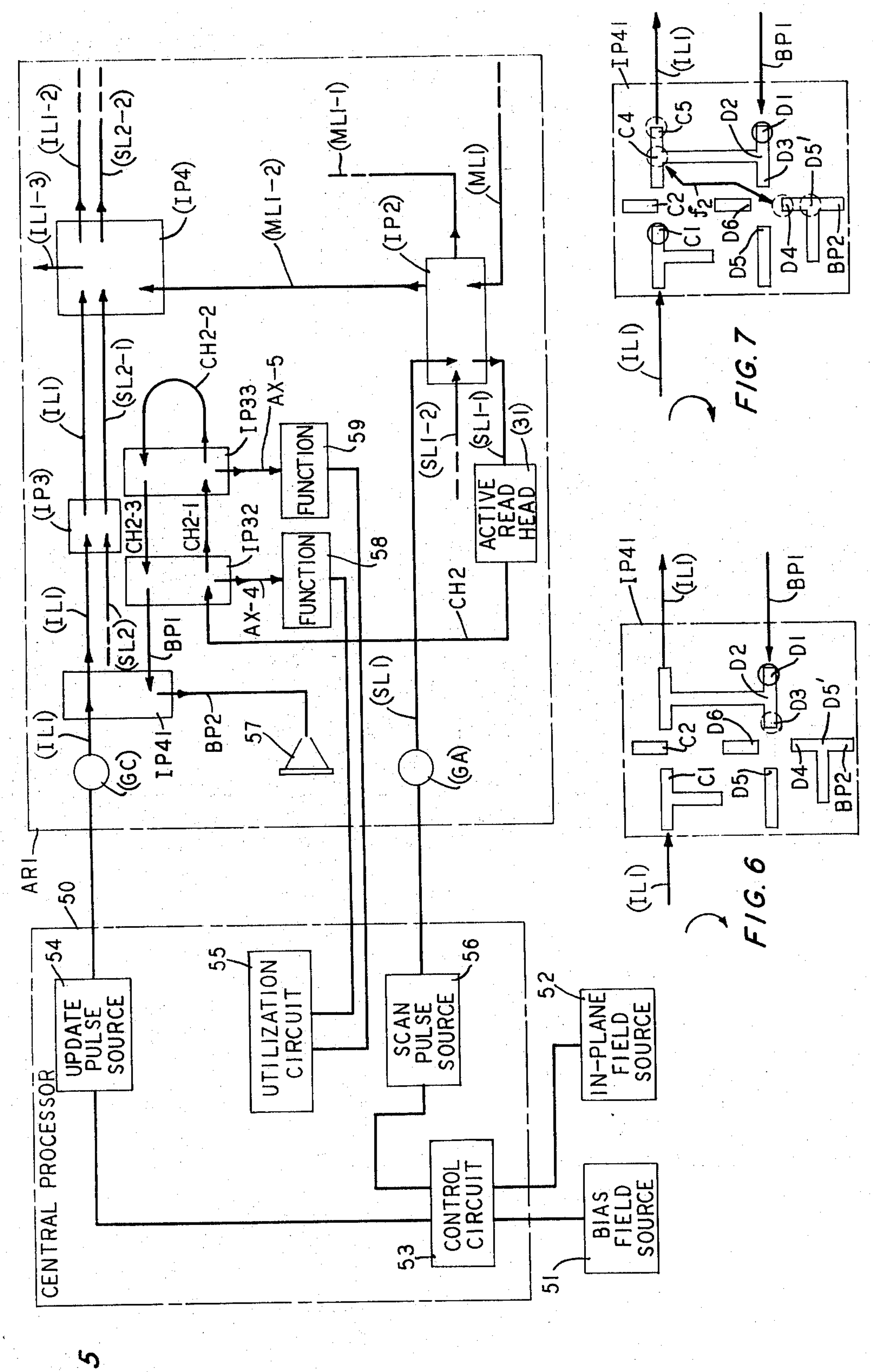
FIG. 5 is a block diagram showing one application of the exemplary embodiment of the invention.
FIGS. 6 and 7 are schematic drawings showing in greater detail interaction point IP41 of FIG. 5.

FIG. 5 shows the logic control arrangement of the instant invention utilized in a scanner arrangement for telephone systems. The designations shown in parentheses correspond to elements shown in the abovementioned Perneski-Smith magnetic domain organization. As discussed in Perneski-Smith, domains representative of the status of telephone lines are contained in the memory loop (ML1) and are circulated sequentially to interaction point (IP2). Domains representative of the present status, as detected by an external detector and supplied by domain generator (GA), are propagated along channel (SL1) in coordinated relationship with domains in channel (ML1). Thus, as discussed in Perneski-Smith, at interaction point (IP2) the domains in channels (SL1) and (ML1) corresponding to the same station will interract to produce outputs. Thus, assuming a domain in channel (SL1) indicating a presently detected off-hook condition of the respective station and assuming that the corresponding station was on-hook on the last cycle, when the domain in channel (SL1) arrives at interaction point (IP2) the domain position corresponding thereto in the memory loop (ML1) is vacant thereby allowing the domain in channel (SL1–1) to pass to active read head (31) whereupon a signal is provided to the central processor 50.

In Perneski-Smith, after the domains pass through the active read head (31) they are then propagated to an annihilation device and reduced. One arrangement for combining the instant invention with the concept taught by Perneski-Smith would be the continuation of domains propagated along channel (SL1–1) to interaction points IP32 and IP33, which points are arranged as discussed above for point IP1 (FIG. 1). The preferred path through interaction points IP32 and IP33 is along the path segments CH2–1, CH2–2, and CH2–3 and again through interaction points IP33 and IP32 and over channel segment BP1 to interaction point IP41. Interaction point IP41 can be arranged, as will be discussed, in any one of several geometries such that domains propagated along channel section BP1 do not pass into channel section BP2 without some force other than the rotating magnetic force being applied thereto. Thus, in the absence of such an external force domains arrive at interaction point IP41 along channel BP1 and remain there. Each succeeding domain arriving along channel BP1 is repelled by the preceding domain and remains behind that domain, along the channel. Accordingly, when a number of domains have been propagated along channel BP1 the domains back up along channel sections CH2–3, CH2–2, CH2–1 and into channel section CH2. Thus, at certain periods of time if the domains arriving at interaction point IP41 are not passed therethrough the domains back up along the channels such that, dependent upon the length of the respective channel sections CH2–3, CH2–2, and CH2–1, domains will be in both positions of either of the interaction points IP32 or IP33 concurrently. Under such conditions the domain along channel section CH2–1 is moved from the preferred path and via one of the alternate paths AX–4 or AX–5 to the respective function circuits 58 or 59.

Accordingly, whenever a mismatch occurs in interaction point (IP2) of the Perneski-Smith arrangement a domain is propagated along channel (SL1–1) and channel CH2 and through the interaction points IP32 and IP33 to interaction point IP41 where the domain is held. Successive mismatches result in domains being propagated sequentially behind the first domain such that at some point in time if the first domain continues to remain in interaction point IP41 domains become present concurrently in both channels of interaction point IP33. Thus domains are propagated along channel AX–5 so as to provide an output function, as controlled by function circuit 59, for the central processor 50. At some point thereafter, if domains continue to be placed in the channel CH2 without being removed at interaction point IP41, domains will be propagated via point IP32 to function circuit 58 thereby further providing output signals for use by utilization circuit 55 and central processor 50.

REMOVAL OF DOMAINS FROM CHANNEL

As discussed in Perneski-Smith, whenever central processor 50 accepts a signal indicating that an update is necessary a domain is generated, FIG. 5, by generator (GC) along channel (IL1). The channel (IL1) is arranged in conjunction with interaction point IP41 such that each domain in channel (IL1) provides a force on any domain held thereat. Accordingly, when a domain is propagated through interaction point IP41 along channel (IL1) that domain causes any domain held in the interaction point IP41 of channel BP1 to be moved along the alternate path to channel BP2 and thereby reduced by domain annihilator 57.

Turning now to FIG. 6, one manner in which interaction point IP41 can be arranged will now be discussed. Assuming that the domain positions of channel (IL1) are vacant and that a domain is propagated along channel BP1 to interaction point IP41 we see that at an arbitrarily selected point a domain will be present in position D1 which position corresponds to vacant position C1. Two successive quadrants of the rotating magnetic field thereafter domain D1 is in position D3. During each of the next three quadrants of the reorienting magnetic field the domain moves through positions D4, D5 and D6 and back to position D3. These last four mentioned positions are idler positions and a domain cannot leave the idler without an external force being applied other than the rotating magnetic force. Thus, any domain propagated to the idler continues to circulate thereat regardless of the quadrant of the rotating magnetic field and regardless of how many domains line up along channel BP1.

Turning now to FIG. 7, we may assume that a domain is present in idler position D4 and a domain is moving along channel (IL1) in response to the updating of the memory. Accordingly, the channel (IL1) domain moves sequentially along positions C1, C2 and C3, and arrives at position C4. The domains in positions C4 and D4 then exert a mutually repulsive force, such as force f2, on each other. Thus, the domain in position D4 moves closer to alternate position D5', than to preferred position D5 and at the next quadrant of the rotating magnetic field, the D4 domain moves to position D5' under the repulsive force f2 from the domain at position C4.

The domains which are backed up along channel BP1 then each advance one position. The domain propagated to position D5' continues along channel BP2 under control of successive reorientations of the rotating magnetic field to the annihilator device, as shown in FIG. 5.

A geometry for maintaining the domains in a queued relationship along channel BP1 would be the arrangement of elements in the manner taught in U.S. Pat. No. 3,577,131, issued May 4, 1971 by R. H. Morrow and A. J. Perneski where domains recirculate in idler positions and move from those positions under control of an external force.

Summarizing briefly, it has been shown that domains have been placed in a channel whenever a mismatch has occurred between the present condition of a line and the past condition of that line. These domains have been backed up along the channel and removed only when an answer signal has been provided. The relative spacing along the channel controls output functions such that when the domains have backed up to a certain point a first function is provided and when the domains have backed up further to a second point a second function is provided. Domains have been removed from the channel one at a time under control of domains representative of update pulses.

CONCLUSION

While the equipment of the invention has been shown in a particular embodiment wherein a single channel has been doubled back upon itself to provide for determining the coincidence of magnetic domains at certain positions of that channel it is understood that such an embodiment is intended only to be illustrative of the present invention and numerous other arrangements may be devised by those skilled in the art without departing from the spirit and scope of the invention.

For example, two or more separate channels may be utilized and certain positions thereof of each compared to determine the time relationship between domains propagated in all of the channels. Under such an arrangement the main channel of the embodiment would be divided into sections such that, as shown in FIG. 1, the channel portion designated CH-4 would essentially be opened and domains propagated from interaction point IP3 would be removed. A new domain generator or other domain source (such as the output from another domain pattern of elements) would be utilized to supply domains to the bottom channel section of interaction point IP3. Thus domains propagated along each section of the main channel would, upon coincidence, provide an output.

What is claimed is:

1. A geometry of elements adapted for controlling the directional movement of magnetic domains in a slice of material in response to a magnetic field reorienting in a plane of said slice, said elements defining a main channel and *n* auxiliary channels, where *n* is a number greater than one,

*n* interaction points each for determining the coincidence of domains located at a first element of said main channel and at a second element of said main channel, each of said interaction points including said first and said second main channel elements, a third main channel element, and a first element of an associated one of said auxiliary channels, said elements of said interaction point arranged such that a coincident domain located at said second element of said interaction point at a particular orientation of said magnetic field will move to said first auxiliary channel element at a next orientation of said magnetic field while a noncoincident domain at said second element of said interaction point at said particular orientation of said magnetic field will move to said third main channel element at said next orientation of said magnetic field.

2. The invention set forth in claim 1 wherein said geometry of elements further defines a domain generator for supplying magnetic domains to said main channel in response to signals applied randomly to said generator.

3. The invention set forth in claim 2 wherein said geometry of elements further defines means for detecting the presence of a domain controlled by a particular one of said auxiliary channel elements and for providing a signal in response to said detection.

4. The invention set forth in claim 1 wherein said main channel comprises a first section and a second section and wherein said first main channel element of each of said interaction points is included within said first section of said main channel and said second and said third main channel elements of each of said interaction points are included within said second section of said main channel, said geometry of elements further defining a channel for supplying magnetic domains exclusively to either of said main channel sections.

5. A single wall domain arrangement comprising a layer of material in which single wall domains can be moved, a pattern of elements for defining first and second channels for moving domains in response to a magnetic field reorienting in the plane of said layer, said second channel being a continuation of said first channel, said elements also defining first and second interaction positions and first and second auxiliary channels respectively, said elements at each said interaction position being arranged such that the coincidence of domains in said first and second channels causes the deflection of one of said domains into said auxiliary channel, and means for introducing domains into said first and second channels in a timed relationship to provide coincidence of domains at said first and second interaction positions selectively.

6. Apparatus comprising a slice of material in which single wall magnetic domains may be propagated in response to the reorientation of a magnetic field, a pattern of elements distributed on a surface of said material for controlling said magnetic domain propagation in said slice of material, said pattern of elements defining a main channel and an auxiliary channel along which domains may be propagated in response to said reorienting magnetic field, each of said channels comprising a plurality of discrete positions therealong, a first interaction point between at least two domain positions of said main channel and one domain position of said auxiliary channel, said first interaction point arranged such that a domain which is propagated through said first interaction point at either of said positions of said main channel to the exclusion of a domain in the other one of said positions of said first interaction point continues along respective positions of said main channel while a domain which is propagated through said first interaction point at one of said positions concurrently with the propagation of a domain through said other one of said positions of said first interaction point propagates successively along respective positions of said auxiliary channel, a second main channel along which domains may be propagated in response to said reorienting magnetic field, a second interaction point between one position of said main channel and at least one position of said second main channel, said second interaction point arranged such that a domain which is propagated to said interaction point at said main channel position prevents the further propagation of domains along said main channel until a domain is propagated to said interaction point at said second main channel position.

7. An arrangement for providing unique outputs in response to the time relationship between discrete input signals comprising a first channel, a plurality of output channels, means for circulating data bits representative of said input signals along said first channel, means associated with each of said output channels for comparing said data bits at certain locations along said first channel with data bits at certain other locations along said first channel, and means responsive to a compared coincidence of data bits at any of said locations for causing a data bit to pass along said output channel associated with said coincident data bit location.

8. The invention set forth in claim 7 wherein each of said comparing means includes an interaction point through which said first channel data bits are moved sequentially through a first and a second location thereat in proximity to each other.

9. The invention set forth in claim 8 wherein said arrangement is a single wall magnetic domain device and wherein said data bits comprise magnetic domains propagated therein.

* * * * *